United States Patent Office 3,367,808
Patented Feb. 6, 1968

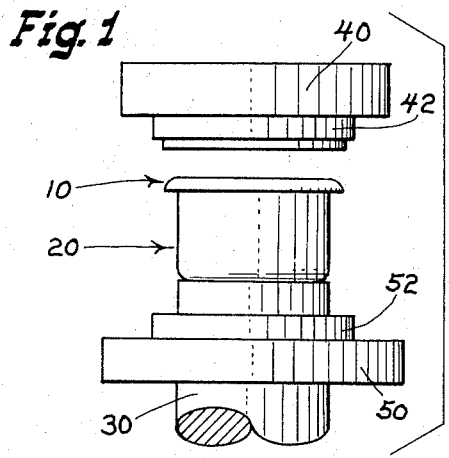
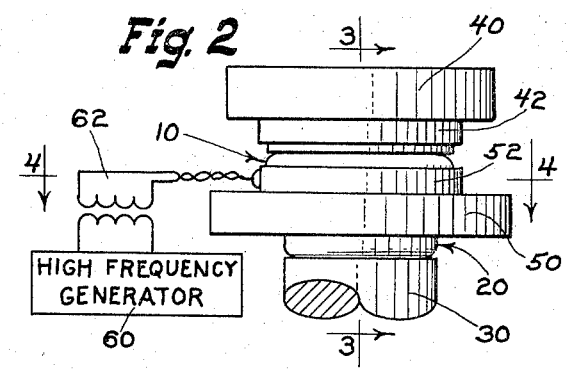
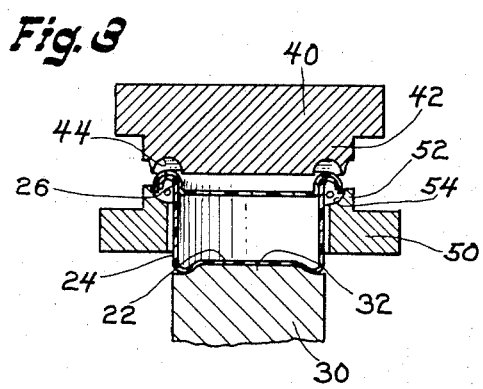
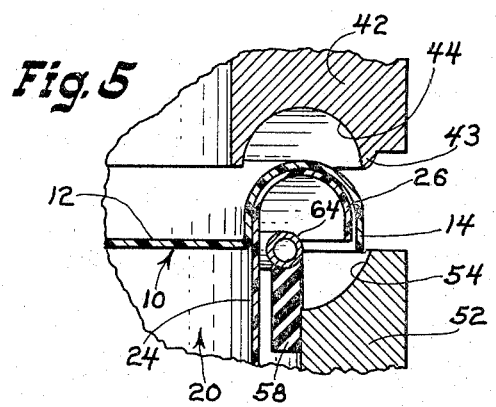
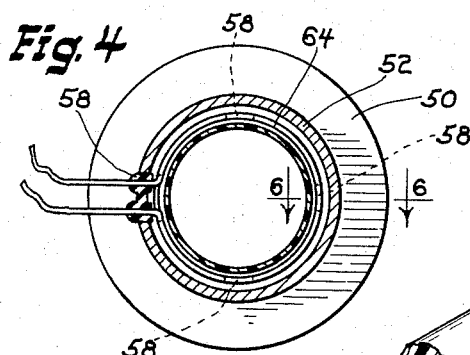
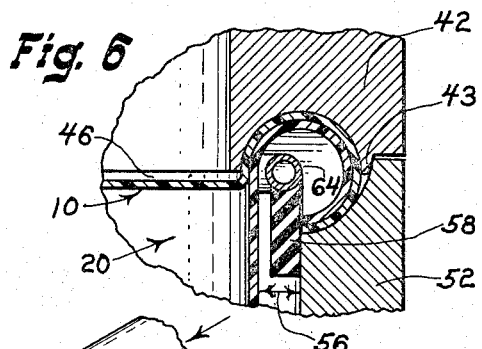
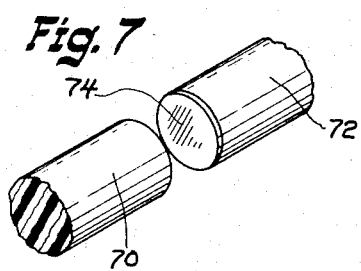
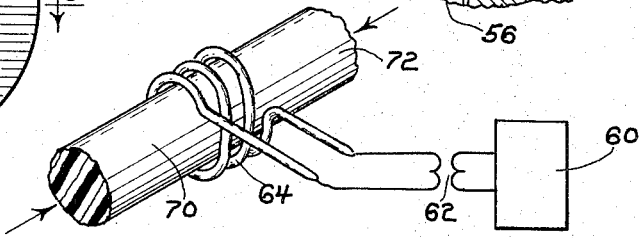
INVENTOR.
Bryant Edwards
BY
Michael Kovac
His Atty

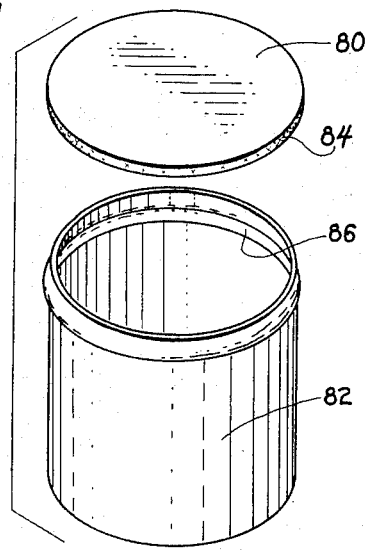
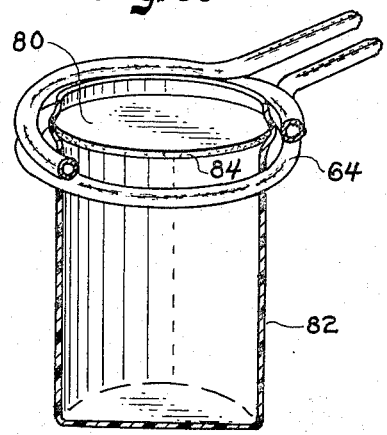
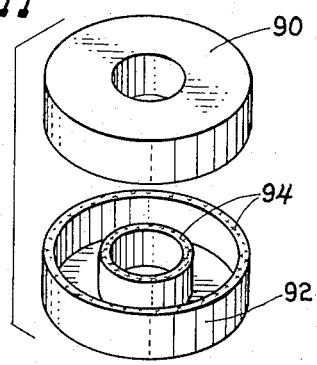
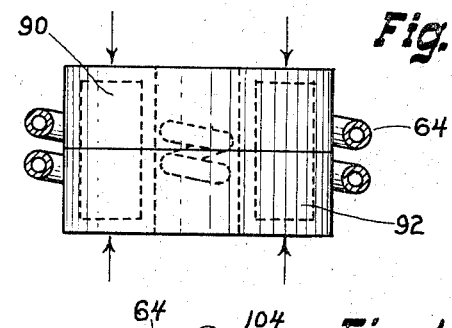
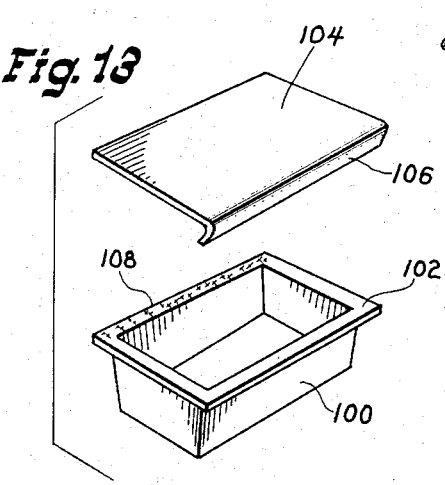
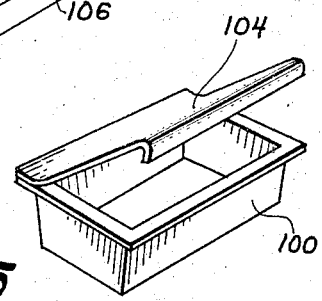

3,367,808
METHOD AND APPARATUS FOR UNITING ARTICLES
Bryant Edwards, Clarendon Hills, Ill., assignor to Illinois Tool Works Inc., Chicago, Ill., a corporation of Delaware
Filed Sept. 28, 1964, Ser. No. 399,637
5 Claims. (Cl. 156—69)

ABSTRACT OF THE DISCLOSURE

Method and apparatus for uniting articles of complementary configuration including the combined techniques of mechanical curling and molecularly bonding portions of the complementary configured articles to each other.

---

It is well known that thermoplastics such as polystyrene, polyvinyl chloride and the like can be heated to a molten state permitting shaping or working into articles of various shapes. It is also commonly known that thermoplastic articles can be heated to a point where they will readily permit fusing or bonding to complementary or similarly shaped articles.

One of the difficulties encountered in uniting thermoplastic articles is that greater areas of the articles may be softened than are necessary, thus resulting in undesired deformations and irregularities. To overcome this, various methods have been proposed, including the use of metallic wire or band elements positioned intermediate the articles to be united which will act as a localizing means to concentrate heat in areas immediately adjacent these metallic elements. Resistance, capacitive and inductive heating methods have been employed to electrically heat these metallic elements, the type of heating method used in any case depending on the location and type of bond desired.

Where resistance and capacitive heating have been used it has generally been necessary to have at least a portion of the metallic element exposed for connection thereto. On the other hand, where it is desired to unite unexposed surfaces of thermoplastic articles, induction heating equipment has been chosen since high frequency magnetic fields can induce currents in the metallic elements to heat the same without the necessity of any contact or engagement.

The use of metallic wire or band elements has necessitated special constructions for the thermoplastic articles due to the necessity of maintaining the elements in a relatively fixed position during the fusing operation. Also, where it is desired to unite substantially planar surfaces, an undesirable hump may be produced as a result of the size of these elements.

Accordingly, it is an object of the present invention to provide a method and apparatus for heat sealing articles which overcome the above noted disadvantages.

It is another object of the present invention to provide a novel method and apparatus for uniting thermoplastic articles without producing distortions or irregularities in the material immediately adjacent the areas where the thermoplastic articles are to be bonded together.

It is a further object of the present invention to provide a novel method and apparatus for fusing or bonding thermoplastic articles without the need of special configurations or modifications of the articles.

Still another object of the present invention is the provision of a method and apparatus for heat sealing thermoplastic articles by the employment of electrical energy, and the conversion of the same into thermo-energy.

A still further object of the present invention is the provision of a novel method and apparatus for heat sealing thermoplastic articles in a fast, efficient and economical manner, and at the same time, effect a strong bond therebetween.

It is also within the purview of the present invention to provide a method and apparatus for sealing and securing thermoplastic and other articles to each other by uniting and establishing a mechanical interlock therebetween.

Other objects and advantages will become apparent from the following description when taken in conjunction with the accompanying drawings wherein:

FIG. 1 is a fragmentary front elevational view of one form of apparatus used in securing a closure to a container, each of which are made of thermoplastic material;

FIG. 2 is a fragmentary front elevational view of the apparatus shown in FIG. 1 during the first phase of the sealing operation;

FIG. 3 is a fragmentary sectional view of the apparatus shown in FIG. 2 and taken along line 3—3 thereof;

FIG. 4 is a top plan view of a portion of the apparatus shown in FIG. 2 and taken along line 4—4 thereof;

FIG. 5 is an enlarged fragmentary sectional view of the apparatus and articles shown in the preceding figures, and just prior to the heat sealing operation;

FIG. 6 is also an enlarged fragmentary sectional view similar to FIG. 5, but showing the joining of the thermoplastic articles to each other;

FIG. 7 is a fragmentary perspective view of a pair of solid tubular rods to be joined together in accordance with the teachings of the present invention;

FIG. 8 is a fragmentary perspective view showing the manner in which the rods of FIG. 7 are joined to one another;

FIG. 9 is an exploded perspective view of a lid and closure member which can be fused or bonded together by following the principles of the instant invention;

FIG. 10 is a fragmentary front elevational view, partly in section, showing the manner in which the closure and container of FIG. 9 are secured to one another;

FIG. 11 is an exploded perspective view of a pair of torus-shaped members which may be secured or heat sealed together by following the teachings of the present invention;

FIG. 12 is a front elevational view, partly in section of the torus-shaped members as they are being secured to one another;

FIG. 13 is an exploded perspective view of yet still another closure and container member which can be fused or heat sealed to one another at selected portions thereof; and FIGS. 14–15 are perspective views of the closure and container shown in FIG. 13, and after they have been secured to one another.

The present invention discloses various methods for securing or uniting articles, preferably of the thermoplastic variety, to one another, the articles shown in the drawing being merely representative of the types of articles upon which the invention may be practiced.

Referring now to the drawings, and in particular to FIGS. 1–6, there is shown a closure or lid member 10 which is to be secured to the container 20. The closure 10 has a substantially planar area 12 which is surrounded by a peripherally continuous flange means 14, here shown to be semi-cylindrical in section. Container 20 has a bottom wall 22 of the "false bottom" variety which is integral with the peripherally continuous side wall 24 extending substantially normal thereto. Adjacent the open upper end of the container is a rim or lip 26 which is complementary in shape to the flange means 14 of the closure. The lip or rim 26 is slightly smaller than the flange means 14 in order to permit the closure to be assembled to the container with the flange means 14 of the closure overlying and resting upon the rim or lip 26 of the container.

As shown in the drawings, the closure and container are preferably made of thermoplastic materials such as polystyrene, polyvinyl chloride, polycarbonate and the like, but can be made of other relatively light weight sheet materials as desired.

The preferred method of assembling the closure 10 to the container 20 is accomplished by supporting the container and closure in an upright position on a support such as the column 30. The column 30 is preferably provided with an upstanding abutment 32 along its upper face which is complementary in configuration to the bottom wall 22 of the container to stabilize and center the container on the column.

Upper and lower forming dies 40, 50 are positioned on opposite sides of the overhanging flange and rim 14, 26 respectively, and are adapted to be actuated toward one another by any suitable means. As best seen in FIGS. 3 and 5–6, the upper forming die 40 has a downwardly extending portion 42 with a recess 44 formed in the lower face thereof, the recess 44 having a configuration complementary to, but slightly smaller than the flange 14 of the closure. Cooperating with the recess 44 in the upper forming die 40 is the recess 54 provided in the upper face of the portion 52 of the lower forming die 50. Recess 54 is large enough to receive the flange 14 and rim 26 as well as annular element 43 of the upper die, the latter being designed to engage and curl the flange and rim for establishing a mechanical interlock therebetween.

The forming dies are preferably heated to a temperature sufficiently high enough to soften the thermoplastic so that as the forming dies close, the flange 14 and rim 26 of the closure and container will be conformed to the die recesses 44, 54. The annular element 43, as has previously been noted, will also act to curl the flange and rim to the position shown in FIG. 6.

If a hermetic seal is desired, a heat activatable material such as a wax or hot-melt cement which can melt at the forming temperature could be positioned intermediate the flange and lid before assembly. The heat of the forming dies would then cause the wax or cement to flow and unite the articles to provide the required seal. In certain instances, it may be desirable to affix or adhesively secure the wax or hot-melt cement to the lid or container to prevent assembly difficulties.

One preferred method of providing a hermetic seal between the closure and container can be accomplished by fusing or bonding the flange 14 of the closure to the rim 26 of the container. In certain cases, the heat from the forming dies may be sufficient to heat the thermoplastic material of the closure and container to the fusing or bonding temperature; however, it has been found that this type of approach results in undesirable deformities and irregularities. This can be avoided by securing or otherwise affixing a relatively thin and continuous coating of metallic particles to one or both of the flange and rim interfaces. These metallic particles, which can be made of iron oxide or the like, will generate enough heat to selective areas of the articles to bring such areas to the fusing temperature for uniting the articles. Thus, the metallic particle coating can also be considered to be a heat activatable uniting element.

For the heating of the coating, induction-type heating equipment is preferred since it is not necessary to contact the articles themselves. One type of such induction equipment is shown in the drawings, and comprises a source of high frequency electrical energy 60 such as a radio frequency oscillation generator of the vacuum tube type. The generator is connected through a transformer 62 to the inductor 64 having one or more turns. The inductor 64 is mounted and supported by the electrical insulation blocks 58 which are attached in any suitable manner to the lower forming die 50 as seen in FIGS. 5–6.

The induction equipment is preferably controlled by the relative shifting movement of the forming dies, and is not energized until after the dies have completed their relative interfitting movement. Then, the high frequency generator 60, acting through the transformer 62 and the inductor 64, will induce a current in the metallic coating, and thereby heat the same to the fusing or bonding temperature for securing the closure and container to one another. Pressure applied through the forming dies 40, 50 will aid in producing an effective bond between the articles.

To prevent softening of the closure 10 and the side wall 24 of the container 20, clearances 46, 56 are provided in the upper and lower forming dies respectively to insulate the closure and container side wall from the heat of the forming dies.

The present invention is not limited to the articles and the apparatus and method just described, but may take other forms as shown in FIGS. 7–15 of the drawings. In FIG. 7, a pair of solid tubular rods 70, 72 with a thin metallic coating 74 applied to the end face of the rod 72 is shown. The rods 70, 72 are adapted to be forced together as indicated by the arrows in FIG. 8, the coating 74 thereafter being subject to the induction of a current therein via the generator 60, transformer 62 and inductors 64 to heat the article interfaces generally opposite the coating 74 on each of the rods and establish a molecular bond between the tubular rods.

In FIGS. 9–10, the articles again take the form of a closure 80 and container 82, but in this case, the outer peripheral margin of the closure is provided with the thin coating of metallic particles, here designated as numeral 84. The closure 80 is adapted to be received within the annular recess 86, the latter having a diameter slightly less than that of the closure 82 to grip and apply a pressure against the closure substantially along the plane thereof. After assembly of the closure within the container, the heating coils 64 are positioned around the exterior of the container in the vicintiy of the closure 80 for inducing a current within the coating 84 to fuse or bond the articles together.

In FIGS. 11–12, a pair of torus-shaped articles 90–92 are shown, and have the particular shape of concentric flanges interconnected at one end thereof by a flat planar element. At the opposite end of at least one of the torus-shaped articles, the thin metallic coating 94 is applied for use in securing the articles in the manner previously discussed.

In FIGS. 13–15, another closure-container construction is shown wherein the container 100 takes the form of a rectangular box having a flange 102 projecting therefrom. The closure member 104 is substantially planar in form and has a downwardly extending depending element 106 which is angularly offset from the plan of the closure by an included angle of less than 90°. The coating 108 is preferably applied only to one area of the flange 102 as shown in FIG. 13. Inductors or heating elements 64 are positioned around that portion of the closure and flange 102 generally in alignment with the coating 108 for inducing a current therewithin in the same manner as heretofore explained. Thereafter, the closure 104 can be repeatedly lifted and re-associated with the container 100 as desired, the depending lip 106 being designed to lock beneath the flange 102 as will be apparent.

From the foregoing description, it will now be apparent that the present invention is designed to rapidly, efficiently, and effectively unite or bond articles made of thermoplastic and other materials without undue distortion or irregularities formed in the articles. It will also be apparent that since the wax, cement or metallic particle coating is preferably affixed to at least one of the articles there will be no problem in locating or supporting the same during the heat sealing operation.

While preferred embodiments of the invention have been shown and described, it is to be understood that changes and variations can be made without departing

I claim:

1. The method of joining a closure to an open upper end of a container wherein said closure is provided with a flange means complementary in configuration to a rim located adjacent the open upper end of said container, comprising the steps of affixing a heat activatable uniting element to predetermined surface areas of said flange or rim, positioning said closure and container adjacent one another with the heat activatable element intermediate the flange and rim thereof, curling said flange and rim together whereby to mechanically interlock said closure and container, and heating said heat activatable element substantially simultaneously with the curling of said flange and rim whereby to unite said closure and container to each other.

2. The method as defined in claim 1 wherein said closure and container are made of thermoplastic materials, and said heat activatable element comprises a substantially continuous film of metallic particles which are adapted to be electrically heated to a temperature sufficient to cause fusing of said closure and container members to each other.

3. The method as defined in claim 1 including the step of exerting a pressure against said closure and container members prior to the heating of said heat activatable element.

4. Apparatus for bonding thermoplastic closure and container articles wherein the closure is provided with a flange means at its outer margin which is complementary in configuration to a rim means adjacent an open upper end of the container, comprising means for supporting said container and closure in an upright position, complementary die members for engaging and curling said flange means and rim together to establish a mechanical interlock between said closure and container, and heating means for stimulating a heat activatable uniting element positioned intermediate said flange means and rim substantially simultaneously with the curling of said flange means and rim to join said container and closure to each other.

5. The apparatus as defined in claim 4 wherein said heat activatable element comprises a relatively thin and continuous metallic coating affixed to said flange or rim means, and said heating means comprises an electrical induction means for inducing a current in the metalized coating to heat it to the fusing temperature of said thermoplastic material whereby to bond said closure and container to each other.

References Cited

UNITED STATES PATENTS

| | | | |
|---|---|---|---|
| 1,813,425 | 7/1931 | Rosaire | 156—272 |
| 2,087,480 | 7/1937 | Pitman | 156—273 |
| 2,184,281 | 12/1939 | Clark | 156—272 |
| 2,393,541 | 1/1946 | Kohler | 156—272 |
| 2,413,449 | 12/1946 | Hatch | 156—69 |
| 2,642,911 | 6/1953 | De Shazor | 156—272 |
| 2,710,986 | 6/1955 | Gray | 156—69 |

DOUGLAS J. DRUMMOND, *Primary Examiner.*